US011942016B2

(12) United States Patent
Park et al.

(10) Patent No.: US 11,942,016 B2
(45) Date of Patent: Mar. 26, 2024

(54) DISPLAY DEVICE AND DRIVING METHOD THEREOF

(71) Applicant: Samsung Display Co., Ltd., Yongin-si (KR)

(72) Inventors: Hee Sook Park, Yongin-si (KR); Ki Hyun Pyun, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/666,391

(22) Filed: Feb. 7, 2022

(65) Prior Publication Data

US 2022/0165203 A1 May 26, 2022

Related U.S. Application Data

(63) Continuation of application No. 17/120,495, filed on Dec. 14, 2020, now Pat. No. 11,244,596.

(30) Foreign Application Priority Data

Apr. 17, 2020 (KR) ........................ 10-2020-0046903

(51) Int. Cl.
*G09G 3/20* (2006.01)

(52) U.S. Cl.
CPC ..... *G09G 3/2092* (2013.01); *G09G 2310/027* (2013.01); *G09G 2320/0271* (2013.01)

(58) Field of Classification Search
CPC ........... G09G 3/2092; G09G 2310/027; G09G 2320/0271; G09G 2320/0257; G09G 2320/046; G09G 2320/0686; G09G 2320/106; G09G 3/3233; G09G 2320/0653; G09G 2320/103; G09G 2360/16; G09G 3/32; G09G 3/3208; G09G 3/3406; G09G 2320/0626
See application file for complete search history.

(56) References Cited

U.S. PATENT DOCUMENTS

| | | | | |
|---|---|---|---|---|
| 6,633,318 | B1 | 10/2003 | Kim et al. | |
| 9,153,161 | B1 * | 10/2015 | Byun | G09G 3/2007 |
| 9,666,116 | B2 * | 5/2017 | Jung | G09G 3/2003 |
| 2005/0110810 | A1 * | 5/2005 | Lee | G09G 5/003 345/690 |

(Continued)

FOREIGN PATENT DOCUMENTS

| | | | |
|---|---|---|---|
| EP | 3869492 | A1 | 8/2021 |
| KR | 10-0438539 | B1 | 7/2004 |

(Continued)

*Primary Examiner* — Jose R Soto Lopez
(74) *Attorney, Agent, or Firm* — Lewis Roca Rothgerber Christie LLP

(57) ABSTRACT

A display device includes: a gain provider configured to set a time point elapsed by a set period from a time point at which a first region of an input image is detected as a still region, as a set time, and to gradually decrease a gain value from the set time; and a grayscale converter configured to generate an output image by applying the gain value to the first region and a second region including a peripheral region of the first region among the input image, wherein the gain provider is configured to set the set period differently according to size of grayscale values in the first region.

17 Claims, 10 Drawing Sheets

(56) References Cited

U.S. PATENT DOCUMENTS

| | | | | |
|---|---|---|---|---|
| 2007/0103408 | A1* | 5/2007 | Tada | G09G 3/2014 345/76 |
| 2007/0182700 | A1* | 8/2007 | Baba | G09G 3/20 345/102 |
| 2008/0111886 | A1* | 5/2008 | Bai | G09G 5/00 348/173 |
| 2008/0158392 | A1* | 7/2008 | Nikata | H04N 5/57 348/E5.022 |
| 2009/0033601 | A1* | 2/2009 | Lee | G09G 3/3233 345/77 |
| 2010/0060554 | A1* | 3/2010 | Koh | G09G 3/3225 345/77 |
| 2010/0060789 | A1* | 3/2010 | Aoki | G09G 5/14 725/33 |
| 2010/0097413 | A1* | 4/2010 | Matsumoto | G09G 3/2944 345/63 |
| 2011/0032268 | A1* | 2/2011 | Takei | H04N 1/00442 345/589 |
| 2011/0043551 | A1* | 2/2011 | Kikuta | G09G 3/3233 345/691 |
| 2011/0298839 | A1* | 12/2011 | Nakanishi | G09G 3/3426 345/690 |
| 2012/0105507 | A1* | 5/2012 | An | G09G 3/3426 345/102 |
| 2012/0293565 | A1* | 11/2012 | Mito | G09G 3/3406 345/102 |
| 2014/0022223 | A1* | 1/2014 | Jung | H04M 1/22 345/207 |
| 2014/0085360 | A1* | 3/2014 | Ohno | G09G 3/36 345/694 |
| 2014/0146066 | A1* | 5/2014 | Kang | G09G 3/3225 345/545 |
| 2014/0146071 | A1* | 5/2014 | Kim | G09G 3/3225 345/589 |
| 2015/0009249 | A1* | 1/2015 | Kudo | G09G 3/3406 345/691 |
| 2015/0364076 | A1* | 12/2015 | Park | G09G 3/3233 345/77 |
| 2016/0055624 | A1* | 2/2016 | Ohno | G09G 5/003 345/589 |
| 2016/0105614 | A1* | 4/2016 | Kudo | G03B 13/02 348/333.12 |
| 2016/0210900 | A1* | 7/2016 | Kim | G09G 3/3266 |
| 2016/0217731 | A1* | 7/2016 | Joo | G09G 3/3208 |
| 2017/0345378 | A1* | 11/2017 | Ryu | G09G 3/3225 |
| 2018/0061368 | A1* | 3/2018 | Sako | G09G 3/342 |
| 2018/0204539 | A1* | 7/2018 | Yang | G06F 1/1652 |
| 2018/0241979 | A1* | 8/2018 | Kanda | H04N 9/68 |
| 2018/0338138 | A1* | 11/2018 | Zeng | G09G 3/32 |
| 2019/0149760 | A1* | 5/2019 | Sasaki | H04N 9/64 348/564 |
| 2019/0191132 | A1* | 6/2019 | Kobayashi | G09G 3/20 |
| 2019/0213953 | A1 | 7/2019 | Koh et al. | |
| 2020/0074911 | A1* | 3/2020 | Park | G09G 5/10 |
| 2020/0082761 | A1* | 3/2020 | Kim | G09G 3/3233 |
| 2020/0143751 | A1* | 5/2020 | Byun | G09G 3/3291 |
| 2021/0043163 | A1* | 2/2021 | Tokuda | B60K 35/00 |
| 2021/0134217 | A1* | 5/2021 | Park | H04N 5/57 |
| 2023/0018404 | A1* | 1/2023 | Zen | G09G 3/2081 |

FOREIGN PATENT DOCUMENTS

| | | | |
|---|---|---|---|
| KR | 10-0477630 | B1 | 5/2005 |
| KR | 10-0497344 | B1 | 9/2005 |
| KR | 10-2016-0018937 | A | 2/2016 |

* cited by examiner

DISPLAY DEVICE AND DRIVING METHOD THEREOF

CROSS-REFERENCE TO RELATED APPLICATIONS

This application is a continuation of U.S. patent application Ser. No. 17/120,495, filed Dec. 14, 2020, which claims priority to and the benefit of Korean Patent Application No. 10-2020-0046903, filed Apr. 17, 2020, the entire content of both of which is incorporated herein by reference.

BACKGROUND

1. Field

Aspects of some example embodiments of the present invention relate to a display device and a driving method thereof.

2. Discussion

With the development of information technology, the use of display devices, which provide a connection medium between users and information, has increased. For example, as technology has developed, the use of display devices such as liquid crystal display devices, organic light emitting display devices, plasma display devices, and the like has increased.

A display device may include a plurality of pixels and display a frame through a combination of light emitted from the pixels. When a plurality of frames are continuously sequentially displayed, a user may recognize the frames as an image (a moving image or a still image).

When displaying a still or static image, a screen saver function that lowers luminance of the image may be used to prevent or reduce afterimages and reduce power consumption. However, when a set time for lowering the luminance of the image is relatively fast, a change in luminance may be visually recognized by the user, and when the set time is relatively slow, an effect of preventing or reducing afterimages and reducing power consumption may be reduced.

The above information disclosed in this Background section is only for enhancement of understanding of the background and therefore the information discussed in this Background section does not necessarily constitute prior art.

SUMMARY

Aspects of some example embodiments according to the present disclosure include a display device and a driving method thereof in which a set time can be appropriately set according to a display image in a screen saver function.

A display device according to some example embodiments of the present invention may include: a gain providing unit (or gain provider) setting a time point elapsed by a set period from a time point at which a first region of an input image is detected as a still region, as a set time, and gradually decreasing a gain value from the set time; and a grayscale conversion unit generating an output image by applying the gain value to the first region and a second region including a peripheral region of the first region among the input image, and the gain providing unit may set the set period differently according to size of grayscale values in the first region.

According to some example embodiments, the gain providing unit may set the set period shorter as the grayscale values in the first region are larger.

According to some example embodiments, the gain providing unit may set the set period shorter as an average value of the grayscale values in the first region is larger.

According to some example embodiments, the gain providing unit may set the set period shorter as a motion degree in the second region is larger.

According to some example embodiments, the gain providing unit may set the set period shorter as a motion degree in the peripheral region is larger.

According to some example embodiments, the gain providing unit may set the set period shorter as a difference between the grayscale values in the first region and grayscale values in the peripheral region is larger.

According to some example embodiments, the gain providing unit may set the set period shorter as a difference between the average value of the grayscale values in the first region and an average value of the grayscale values in the peripheral region is larger.

According to some example embodiments, the gain providing unit may set the set period shorter as a load value of the input image is smaller.

According to some example embodiments, the load value may be a sum value or an average value of grayscale values in an entire region of the input image.

According to some example embodiments, the gain providing unit may include: a still region detection unit detecting the first region of the input image as the still region and providing the grayscale values of the first region; a set period setting unit setting the set period shorter as the grayscale values in the first region are larger; and a gain generating unit gradually decreasing the gain value from the set time based on the set period.

According to some example embodiments, the gain providing unit may further include a motion detection unit detecting the motion degree in the second region, and the set period setting unit may set the set period shorter as the motion degree is larger.

According to some example embodiments, the gain providing unit may further include a grayscale comparison unit calculating the difference between the grayscale values in the first region and the grayscale values in the peripheral region, and the set period setting unit may set the set period shorter as the difference is larger.

According to some example embodiments, the gain providing unit may further include a load calculation unit calculating the sum value or the average value of the grayscale values in the entire region of the input image as the load value, and the set period setting unit may set the set period shorter as the load value is smaller.

A display device according to some example embodiments of the present invention may include: first pixels displaying a still image portion; and second pixels displaying a moving image portion. From a first time point elapsed by a first period from a display start time point of the still image portion, the first pixels may gradually decrease an average luminance of the still image portion, and the second pixels may gradually decrease an average luminance of the moving image portion, and the first period may be set differently according to an average luminance of the first pixels at the display start time point.

According to some example embodiments, the first period may be set to be shorter as the average luminance of the first pixels at the display start time point is larger.

According to some example embodiments, the first period may be set to be shorter as a motion degree of the moving image portion is larger.

According to some example embodiments, the first period may be set to be shorter as a difference between the average luminance of the still image portion and the average luminance of the moving image portion is larger.

A driving method of a display device according to some example embodiments of the present invention may include: detecting a first region of an input image as a still region; setting a time point elapsed by a set period from a time point at which the still region is detected, as a set time; gradually decreasing a gain value from the set time; and generating an output image by applying the gain value to the first region and a second region including a peripheral region of the first region among the input image, and the set period may be set differently according to size of grayscale values in the first region.

According to some example embodiments, the set period may be set to be shorter as the grayscale values in the first region are larger.

According to some example embodiments, the set period may be set to be shorter as a motion degree in the second region is larger.

BRIEF DESCRIPTION OF THE DRAWINGS

The accompanying drawings, which are included to provide a further understanding of the inventive concepts, and are incorporated in and constitute a part of this specification, illustrate aspects of some example embodiments of the inventive concepts, and, together with the description, serve to explain principles of the inventive concepts.

DETAILED DESCRIPTION

Figure 1:
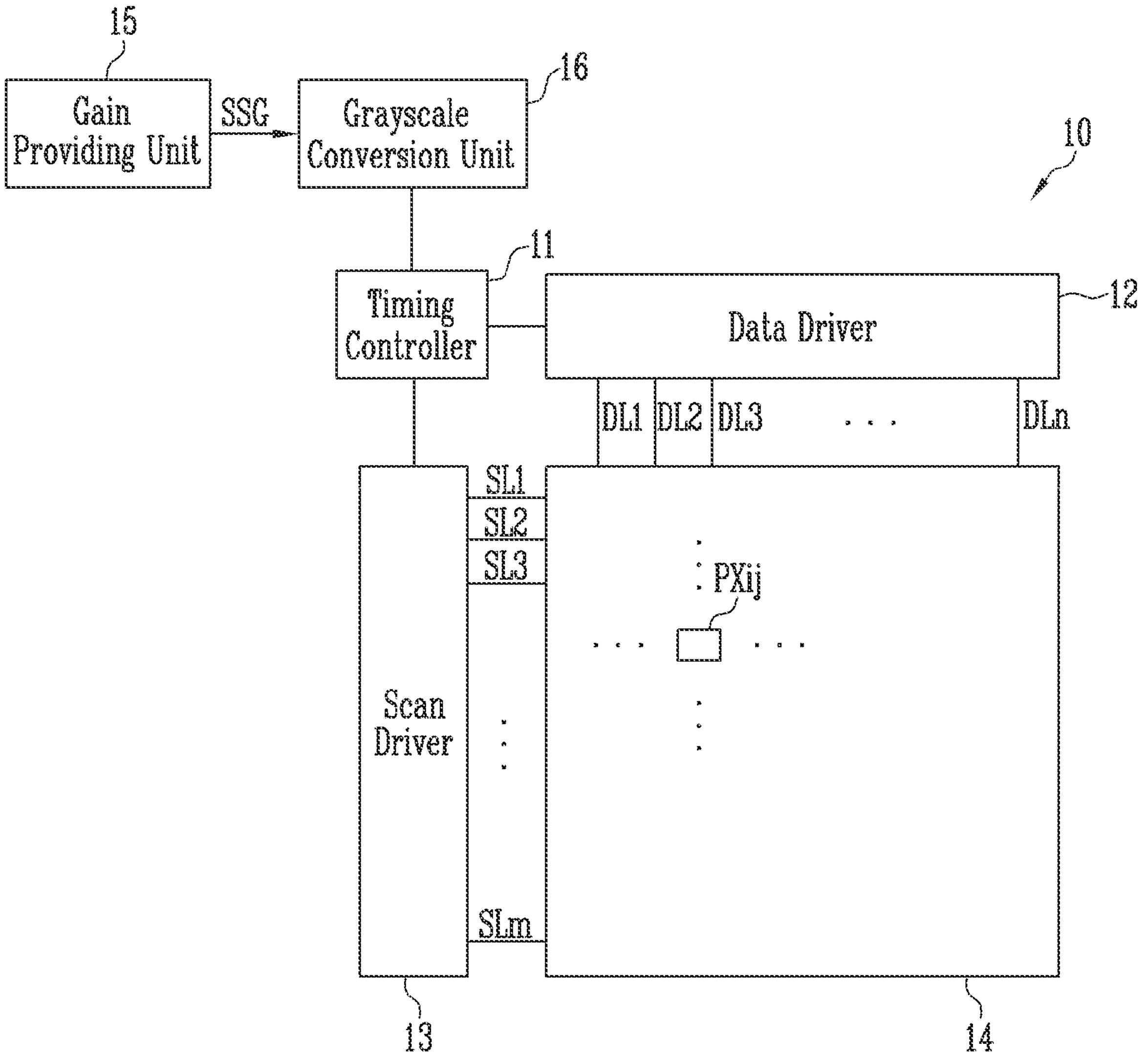
FIG. 1 is a block diagram for explaining a display device according to some example embodiments of the present invention.

Hereinafter, aspects of some example embodiments of the present invention will be described in more detail with reference to the accompanying drawings so that those skilled in the art can easily implement the present invention. The present invention may be embodied in various different forms and is not limited to the embodiments described herein. The embodiments of the present invention may be used in combination with each other, or may be used independently of each other.

In order to clearly describe the present invention, parts that are not related to the description are omitted, and the same or similar components are denoted by the same reference numerals throughout the specification. Therefore, the above-mentioned reference numerals can be used in other drawings.

In addition, the size and thickness of each component shown in the drawings are arbitrarily shown for convenience of description, and thus the present invention is not necessarily limited to those shown in the drawings. In the drawings, thicknesses may be exaggerated to clearly express the layers and regions.

FIG. 1 is a block diagram for explaining a display device according to some example embodiments of the present invention.

Referring to FIG. 1, a display device 10 according to some example embodiments of the present invention may include a timing controller 11, a data driver 12, a scan driver 13, a pixel unit 14, a gain providing unit (or gain provider or gain circuit) 15, and a grayscale conversion unit (or grayscale converter or grayscale conversion circuit) 16.

The timing controller 11 may receive grayscale values and control signals for each input image from an external processor. For example, in the case of a still image, the grayscale values of input images continuously provided in units of frames may be substantially the same. For example, in the case of a moving image, the grayscale values of input images continuously provided in units of frames may be substantially different. Meanwhile, an image may include both a still image portion and a moving image portion. For example, the grayscale values of the input images continuously provided in units of frames may be substantially the same in the still image portion and substantially different in the moving image portion.

The gain providing unit 15 may provide a gain value SSG based on the input images. For example, the gain providing unit 15 may set a time point elapsed by a set period from a time point at which a first region of an input image is detected as a still region, as a set time, and gradually (e.g., in set or predefined increments) decrease the gain value SSG from the set time. For example, the gain providing unit 15 may set the set period differently according to the size of grayscale values in the first region.

The grayscale conversion unit 16 may generate an output image by applying the gain value SSG to the input image. For example, the grayscale conversion unit 16 may generate the output image by applying the gain value SSG to the first region and a second region including a peripheral region of the first region among the input image. For example, the gain value SSG may be 0 or more and 1 or less. The gain value SSG may be 0% or more and 100% or less. In addition to this, a method of expressing the gain value SSG may be various. The grayscale conversion unit 16 may calculate grayscale values of the output image by multiplying grayscale values of the input image by the gain value SSG. For example, the grayscale conversion unit 16 may generate the grayscale values of the output image by reducing the grayscale values of the input image at a ratio according to the gain value SSG.

The timing controller 11 may provide the grayscale values of the output image to the data driver 12. In addition, the timing controller 11 may provide control signals suitable for specifications of the data driver 12 and the scan driver 13 to display the output image.

The data driver 12 may generate data voltages to be provided to data lines DL1, DL2, DL3, and DLn by using the grayscale values of the output image and the control signals, where n may be an integer greater than 0. For example, the data driver 12 may sample the grayscale values using a clock signal and apply the data voltages corresponding to the grayscale values to the data lines DL1 to DLn in units of pixel rows. A pixel row may mean pixels connected to the same scan line.

The scan driver 13 may receive a clock signal, a scan start signal, and the like from the timing controller 11 and generate scan signals to be provided to scan lines SL1, SL2, SL3, and SLm, where m may be an integer greater than 0.

The scan driver 13 may sequentially supply the scan signals having a turn-on level pulse to the scan lines SL1 to SLm. The scan driver 13 may include scan stages configured in the form of a shift register. The scan driver 13 may generate the scan signals by sequentially transmitting the scan start signal in the form of a turn-on level pulse to a next scan stage according to control of the clock signal.

The pixel unit 14 may include pixels. Each pixel PXij may be connected to a corresponding data line and scan line, where i and j may be integers greater than 0. The pixel PXij may mean a pixel whose scan transistor is connected to an i-th scan line and a j-th data line.

Figure 2:
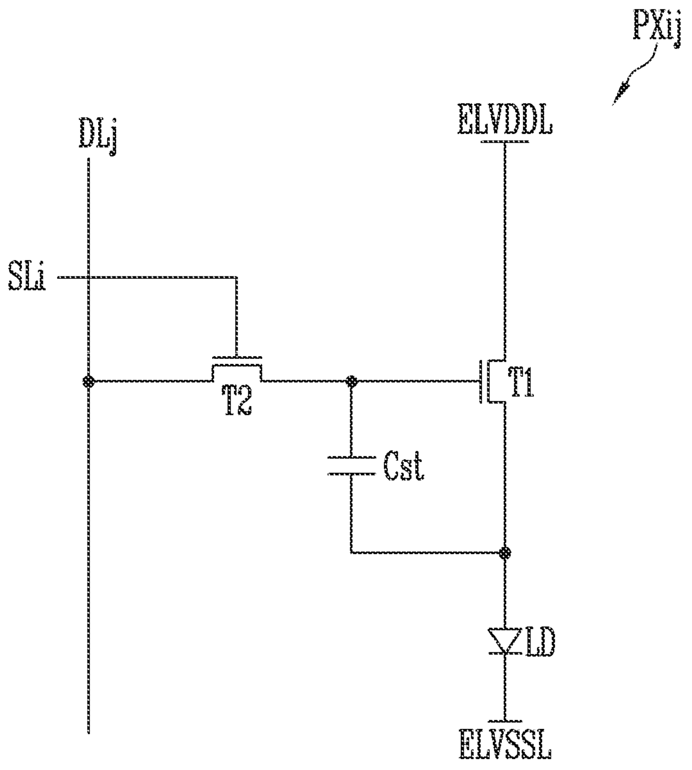
FIG. 2 is a circuit diagram for explaining a pixel according to some example embodiments of the present invention.

FIG. 2 is a circuit diagram for explaining a pixel according to some example embodiments of the present invention.

Referring to FIG. 2, a pixel PXij may include transistors T1 and T2, a storage capacitor Cst, and a light emitting diode LD.

Hereinafter, a circuit composed of an N-type transistor will be described as an example. However, a person skilled in the art will be able to design a circuit composed of a P-type transistor by changing the polarity of a voltage applied to a gate terminal. Similarly, a person skilled in the art will be able to design a circuit composed of a combination of the P-type transistor and the N-type transistor. The P-type transistor generally refers to a transistor in which the amount of current conducted increases when a voltage difference between a gate electrode and a source electrode increases in a negative direction. The N-type transistor generally refers to a transistor in which the amount of current conducted increases when the voltage difference between the gate electrode and the source electrode increases in a positive direction. The transistors may be configured in various forms such as a thin film transistor (TFT), field effect transistor (FET), or bipolar junction transistor (BJT).

A first transistor T1 may include a gate electrode connected to a first electrode of the storage capacitor Cst, a first electrode connected to a first power source line ELVDDL, and a second electrode connected to a second electrode of the storage capacitor Cst. The first transistor T1 may be referred to as a driving transistor.

A second transistor T2 may include a gate electrode connected to an i-th scan line SLi, a first electrode connected to a j-th data line DLj, and a second electrode connected to the gate electrode of the first transistor T1. The second transistor T2 may be referred to as a scan transistor.

The storage capacitor Cst may include the first electrode connected to the gate electrode of the first transistor T1 and the second electrode connected to the second electrode of the first transistor T1.

The light emitting diode LD may include an anode connected to the second electrode of the first transistor T1 and a cathode connected to a second power source line ELVSSL. The light emitting diode LD may be composed of an organic light emitting diode, an inorganic light emitting diode, a quantum dot/well light emitting diode, or the like. Meanwhile, in FIG. 2, the pixel PXij is shown to include one light emitting diode LD as an example. However, according to some example embodiments, the pixel PXij may include a plurality of light emitting diodes connected in series or/and in parallel.

A first power source voltage may be applied to the first power source line ELVDDL, and a second power source voltage may be applied to the second power source line ELVSSL. For example, the first power source voltage may be greater than the second power source voltage.

When a scan signal of a turn-on level (here, a logic high level) is applied through the scan line SLi, the second transistor T2 may be turned on. At this time, a data voltage applied to the data line DLj may be stored in the first electrode of the storage capacitor Cst.

A positive driving current corresponding to a voltage difference between the first electrode and the second electrode of the storage capacitor Cst may flow between the first electrode and the second electrode of the first transistor T1. Accordingly, the light emitting diode LD may emit light with luminance corresponding to the data voltage.

Next, when the scan signal of a turn-off level (here, a logic low level) is applied through the scan line SLi, the second transistor T2 may be turned off, and the data line DLj and the first electrode of the storage capacitor Cst may be electrically isolated. Therefore, even if the data voltage of the data line DLj changes, the voltage stored in the first electrode of the storage capacitor Cst may not change.

The embodiments can be applied not only to the pixel PXij shown in FIG. 2, but also to pixels of other pixel circuits.

Figure 3:
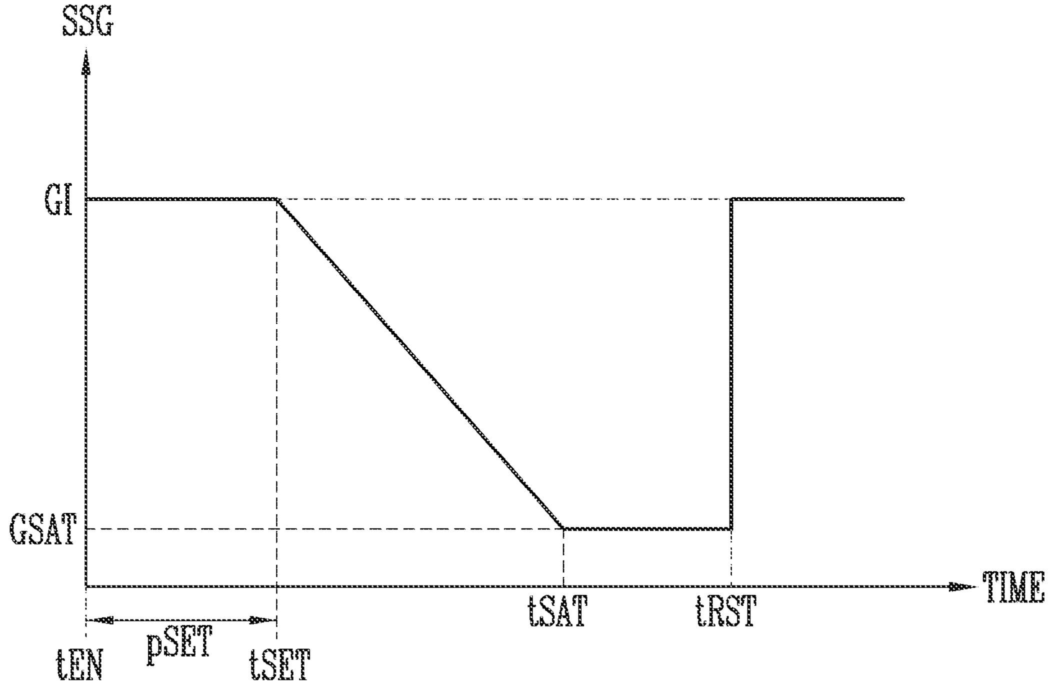
FIG. 3 is a diagram for explaining an operation of a gain providing unit according to some example embodiments of the present invention.

FIG. 3 is a diagram for explaining an operation of a gain providing unit according to some example embodiments of the present invention.

Referring to FIG. 3, a gain value SSG provided from the gain providing unit 15 according to a change in time is shown.

An enable time point tEN may be a time point at which the first region of the input image is detected as the still region. When all or part of the input image is detected as the still region, a screen save function may be enabled to prevent or reduce afterimages and reduce power consumption by lowering the luminance of the image as described above. The gain value SSG at the enable time point tEN may have an initial level GI.

The gain providing unit 15 may set a time point elapsed by a set period pSET from the enable time point tEN as a set time tSET. The gain providing unit 15 may gradually (e.g., in set or predetermined increments) decrease the gain value SSG from the set time tSET. For example, the gain providing unit 15 may gradually decrease the gain value SSG until the gain value SSG reaches a saturation level GSAT.

A saturation time point tSAT may be a time point at which the gain value SSG reaches the saturation level GSAT. The gain providing unit 15 may maintain the gain value SSG from the saturation time point tSAT.

A reset time point tRST may be a time point at which it is determined that the first region is no longer the still region. For example, it may be the case where the still image of the first region is converted to another still image or is converted to the moving image. At this time, the gain providing unit 15 may return the gain value SSG to the initial level GI.

When the set time tSET is fast, a change in luminance may be visually recognized by a user, and when the set time tSET is slow, an effect of preventing or reducing afterimages and reducing power consumption may be reduced. Therefore, it is necessary to set the set time tSET properly.

Figure 4:
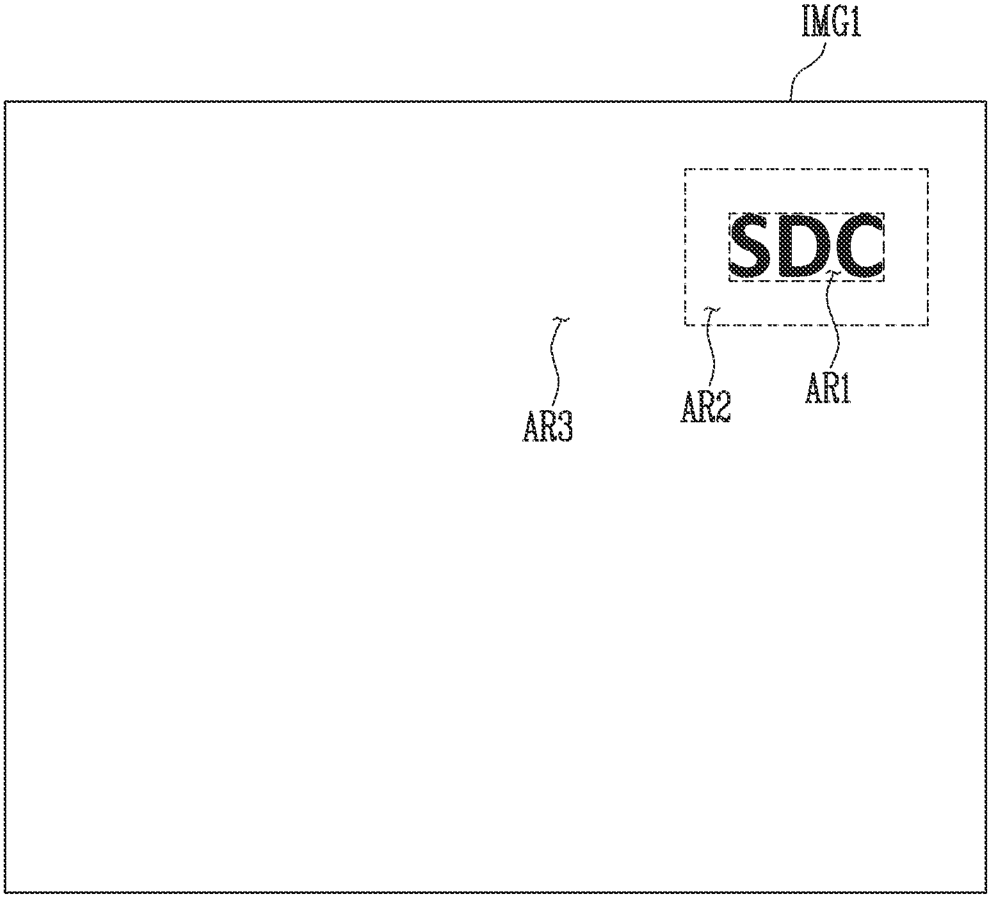
FIG. 4 is a diagram for explaining regions of an input image according to some example embodiments of the present invention.

FIG. 4 is a diagram for explaining regions of an input image according to some example embodiments of the present invention.

An input image IMG1 may include a first region AR1 detected as the still region. For example, the first region AR1 may display a logo, a banner, or the like. For example, the first region AR1 may be a rectangular region surrounding the outside of the logo. For another example, the first region AR1 may be a region having a shape that matches the outline of the logo.

The input image IMG1 may include the first region AR1 and a second region AR2 including a peripheral region of the first region AR1. The second region AR2 may be a part of the input image IMG1. According to some example embodiments, the second region AR2 may be the entire region of the input image IMG1.

The input image IMG1 may include the second region AR2 and a third region AR3 including a peripheral region of the second region AR2. The third region AR3 may be the entire region of the input image IMG1. According to some example embodiments, the second region AR2 and the third region AR3 may coincide with each other.

For example, first pixels of the pixel unit 14 may display the still image portion in the first region AR1. In addition, second pixels of the pixel unit 14 may display the moving image portion in the peripheral region of the first region AR1 (for example, the second region AR2 or the third region AR3). From a first time point (the set time tSET) elapsed by a first period (for example, the set period pSET) from a display start time point (for example, the enable time point tEN) of the still image portion, the first pixels gradually decrease an average luminance of the still image portion, and the second pixels gradually decrease an average luminance of the moving image portion.

In this case, the first period may be set differently according to the average luminance of the first pixels at the display start time point. For example, the first period may be set to be shorter as the average luminance of the first pixels at the display start time point is larger (refer to FIGS. 5 to 7). For example, the first period may be set to be shorter as a motion degree of the moving image portion is larger (refer to FIGS. 8 to 10). For example, the first period may be set to be shorter as a difference between the average luminance of the still image portion and the average luminance of the moving image portion is larger (refer to FIGS. 11 to 13).

Figure 5:
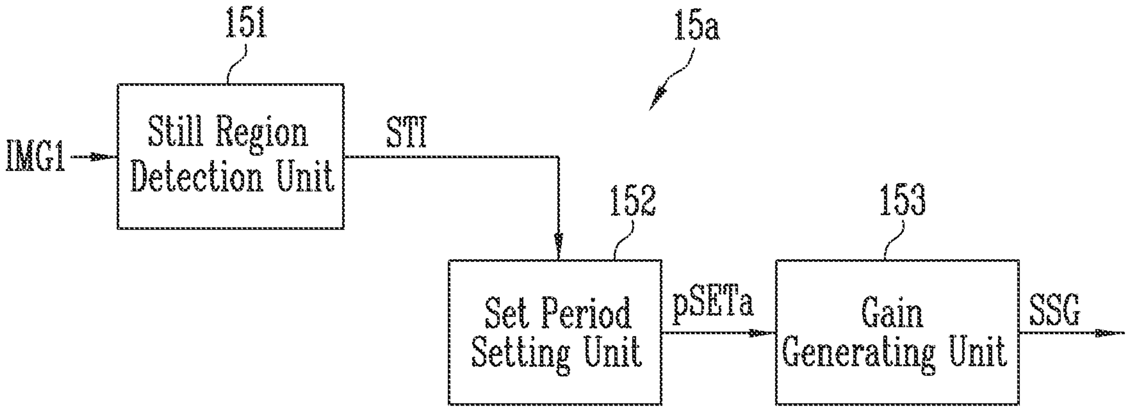
FIGS. 5 to 7 are diagrams for explaining a gain providing unit according to some example embodiments of the present invention.
Figure 6:
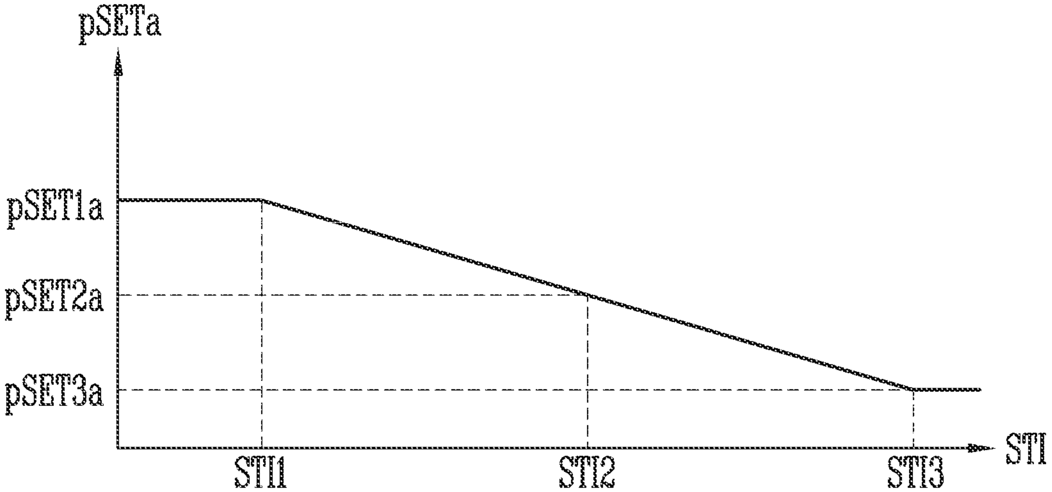
Figure 7:
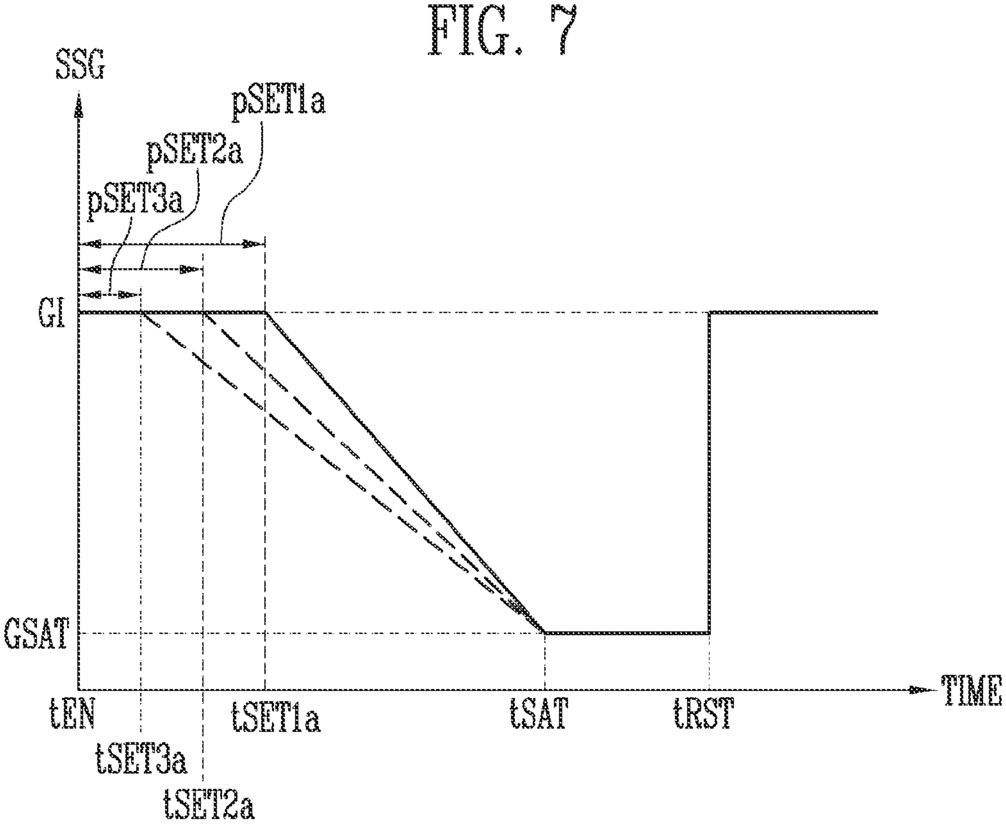

FIGS. 5 to 7 are diagrams for explaining a gain providing unit according to some example embodiments of the present invention.

Referring to FIG. 5, a gain providing unit (or gain provider or gain providing circuit) 15*a* according to some example embodiments of the present invention may include a still region detection unit (or still region detector or still region detection circuit) 151, a set period setting unit (or set period setter or set period setting circuit) 152, and a gain generating unit (or gain generator or gain generating circuit) 153.

The gain providing unit 15*a* may set a set period pSETa shorter as grayscale values in the first region AR1 are larger. For example, the gain providing unit 15*a* may set the set period pSETa shorter as an average value of the grayscale values in the first region AR1 is larger.

The still region detection unit (or still region detector or still region detection circuit) 151 may detect the first region AR1 of the input image IMG1 as the still region and provide grayscale values STI of the first region AR1. For example, the still region detection unit 151 may compare grayscale values of the input image IMG1 of a previous frame period with grayscale values of the input image IMG1 of a current frame period to detect that the input image IMG1 includes the still region. For example, the still region detection unit 151 may detect the first region AR1 in which the difference between the grayscale values of the input image IMG1 of the previous frame period and the grayscale values of the input image IMG1 of the current frame period is equal to or less than a reference value, as the still region. According to some example embodiments, the still region detection unit 151 may use a still region detection algorithm according to the prior art.

The set period setting unit 152 may set the set period pSETa shorter as the grayscale values STI in the first region AR1 are larger. For example, the set period setting unit 152 may set the set period pSETa shorter as the average value of the grayscale values STI in the first region AR1 is larger.

Referring to FIG. 6, the set period setting unit 152 may set a first period pSET1*a* as the set period pSETa when the grayscale values STI are a first level STI1. The set period setting unit 152 may set a second period pSET2*a* as the set period pSETa when the grayscale values STI are a second level STI2. Also, the set period setting unit 152 may set a third period pSET3*a* as the set period pSETa when the grayscale values STI are a third level STI3. In this case, the second level STI2 may be greater than the first level STI1, and the third level STI3 may be greater than the second level STI2. In this case, each of the first, second, and third levels STI1, STI2, and STI3 may be an average value or a sum value of the grayscale values STI of the first region AR1.

In this case, the second period pSET2*a* may be shorter than the first period pSET1*a*, and the third period pSET3*a* may be shorter than the second period pSET2*a*. The first, second, and third periods pSET1*a*, pSET2*a*, and pSET3*a* for the first, second, and third levels STI1, STI2, and STI3 may be previously stored in a lookup table or the like, respectively, or may be calculated by an algorithm.

The gain generating unit 153 may gradually decrease the gain value SSG from the set time tSET based on the set period pSETa.

Referring to FIG. 7, when the gain generating unit 153 receives the set period pSETa of the first period pSET1*a*, the gain generating unit 153 may set a first time point tSET1*a* elapsed by the first period pSET1*a* from the enable time point tEN as the set time tSET. When the gain generating unit 153 receives the set period pSETa of the second period pSET2*a*, the gain generating unit 153 may set a second time point tSET2*a* elapsed by the second period pSET2*a* from the enable time point tEN as the set time tSET. Also, when the gain generating unit 153 receives the set period pSETa of the third period pSET3*a*, the gain generating unit 153 may set a third time point tSET3*a* elapsed by the third period pSET3*a* from the enable time point tEN as the set time tSET. In this case, the first time point tSET1*a* may be later than the second time point tSET2*a*, and the second time point tSET2*a* may be later than the third time point tSET3*a*.

The higher the grayscale of the still region, the more disadvantageous in terms of afterimages and power consumption. According to some example embodiments, the set time tSET may be set to be faster as the grayscale of the still region is higher. Therefore, the afterimages can be prevented or reduced and the power consumption can be reduced.

Figure 8:
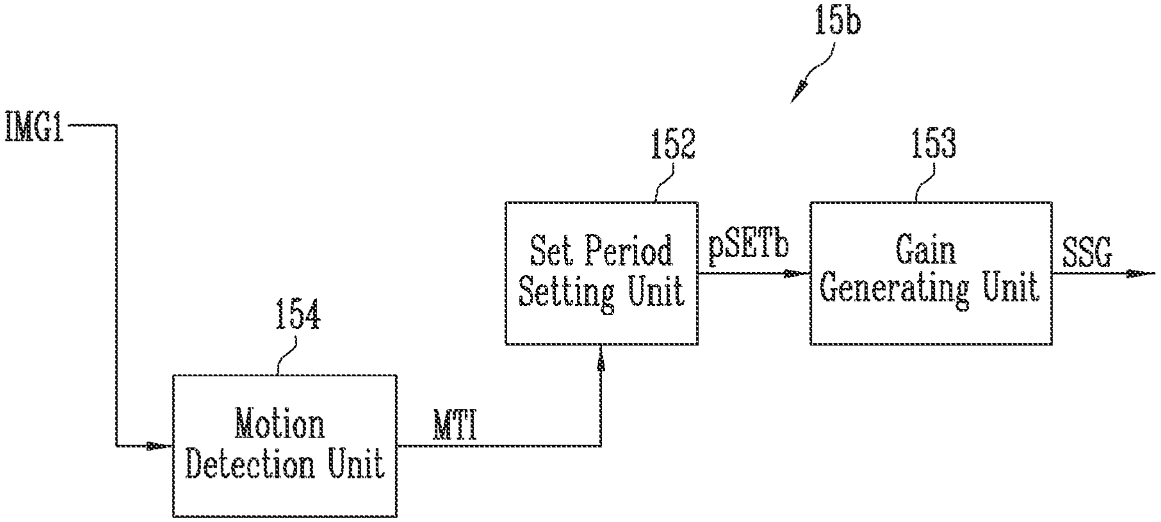
FIGS. 8 to 10 are diagrams for explaining a gain providing unit according to some example embodiments of the present invention.
Figure 9:
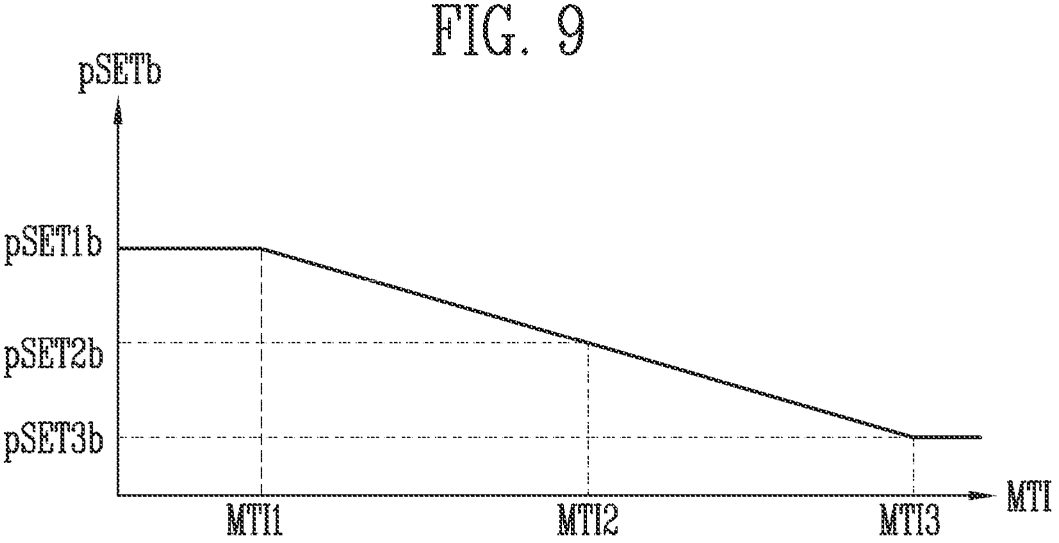
Figure 10:
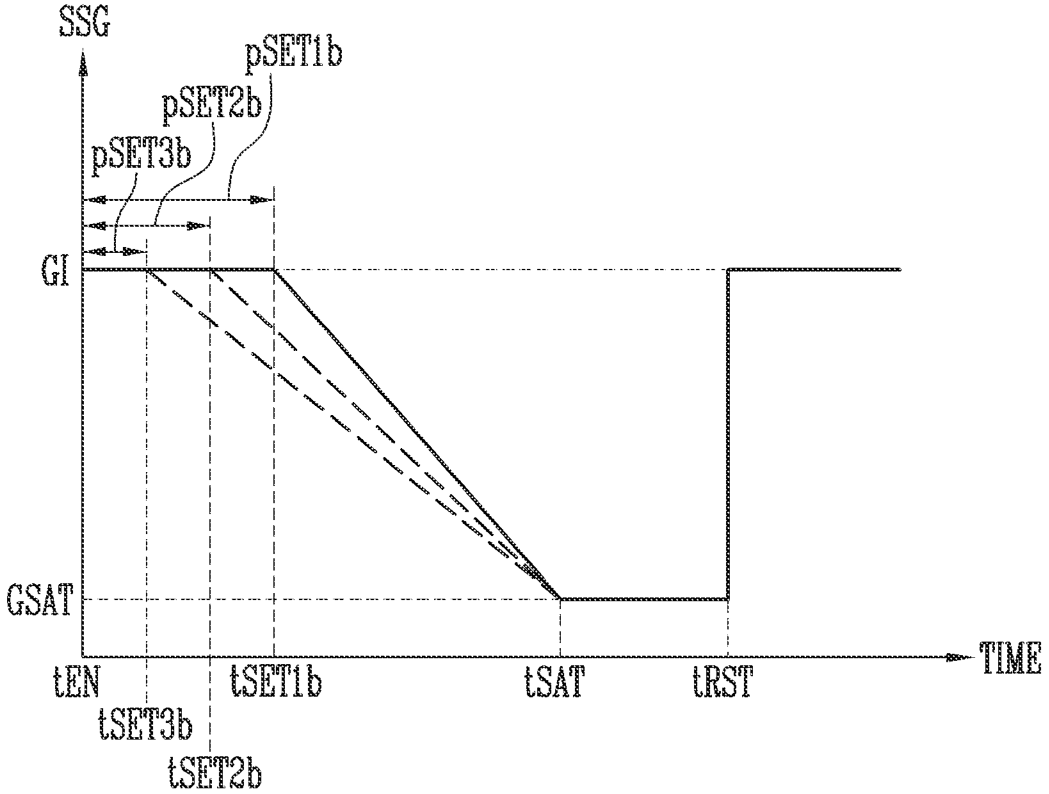

FIGS. 8 to 10 are diagrams for explaining a gain providing unit according to some example embodiments of the present invention.

Referring to FIG. 8, a gain providing unit 15*b* according to some example embodiments of the present invention may include a motion detection unit 154, a set period setting unit 152, and a gain generating unit 153.

The gain providing unit 15*b* may set a set period pSETb shorter as a motion degree of the second region AR2 is larger. For example, the gain providing unit 15*b* may set the set period pSETb shorter as the motion degree of the peripheral region of the first region AR1 is larger.

The motion detection unit (or motion detector or motion detection circuit) 154 may detect a motion degree MTI of the second region AR2. For example, the motion detection unit 154 may compare the grayscale values of the input image IMG1 of the previous frame period with the grayscale values of the input image IMG1 of the current frame period to detect the motion degree MTI of the second region AR2. For example, in the second region AR2, the motion detection unit 154 may determine the motion degree MTI larger as the difference between the grayscale values of the input image IMG1 of the previous frame period and the grayscale values of the input image IMG1 of the current frame period is larger. According to some example embodiments, the motion detection unit 154 may detect the motion degree MTI of the peripheral region of the first region AR1. According to some example embodiments, the motion detection unit 154 may use a motion degree detection algorithm according to the prior art.

The set period setting unit 152 may set the set period pSETb shorter as the motion degree MTI is larger. For example, the set period setting unit 152 may set the set period pSETb shorter as the motion degree MTI of the peripheral region of the first region AR1 is larger.

Referring to FIG. 9, the set period setting unit 152 may set a first period pSET1*b* as the set period pSETb when the motion degree MTI is a first level MTI1. The set period setting unit 152 may set a second period pSET2*b* as the set period pSETb when the motion degree MTI is a second level MTI2. Also, the set period setting unit 152 may set a third period pSET3*b* as the set period pSETb when the motion degree MTI is a third level MTI3. In this case, the second level MTI2 may be greater than the first level MTI1, and the third level MTI3 may be greater than the second level MTI2. For example, the larger the level of the motion degree MTI, the larger the difference between the grayscale values of the input image IMG1 of the previous frame period and the grayscale values of the input image IMG1 of the current frame period. For example, for continuous input images, the user may recognize the input images as the still image at the first level MTI1, and the user may recognize the input images as the moving image at the third level MTI3.

In this case, the second period pSET2*b* may be shorter than the first period pSET1*b*, and the third period pSET3*b* may be shorter than the second period pSET2*b*. The first, second, and third periods pSET1*b*, pSET2*b*, and pSET3*b* for the first, second, and third levels MTI1, MTI2, and MTI3 may be previously stored in a lookup table or the like, respectively, or may be calculated by an algorithm.

The gain generating unit 153 may gradually decrease the gain value SSG from the set time tSET based on the set period pSETa.

Referring to FIG. 10, when the gain generating unit 153 receives the set period pSETb of the first period pSET1*b*, the gain generating unit 153 may set a first time point tSET1*b* elapsed by the first period pSET1*b* from the enable time point tEN as the set time tSET. When the gain generating unit 153 receives the set period pSETb of the second period pSET2*b*, the gain generating unit 153 may set a second time point tSET2*b* elapsed by the second period pSET2*b* from the enable time point tEN as the set time tSET. Also, when the gain generating unit 153 receives the set period pSETb of the third period pSET3*b*, the gain generating unit 153 may set a third time point tSET3*b* elapsed by the third period pSET3*b* from the enable time point tEN as the set time tSET. In this case, the first time point tSET1*b* may be later than the second time point tSET2*b*, and the second time point tSET2*b* may be later than the third time point tSET3*b*.

According to some example embodiments, the user may be insensitive to the change in luminance as the motion degree MIT is larger. Therefore, the user can set the set time tSET fast. The faster the set time tSET is, the effect of preventing or reducing afterimages and reducing power consumption can be maximized.

Figure 11:
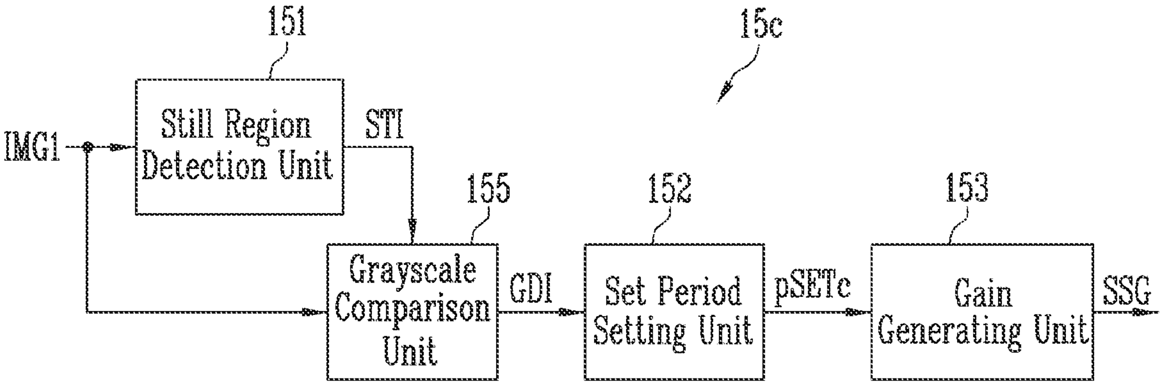
FIGS. 11 to 13 are diagrams for explaining a gain providing unit according to some example embodiments of the present invention.
Figure 12:
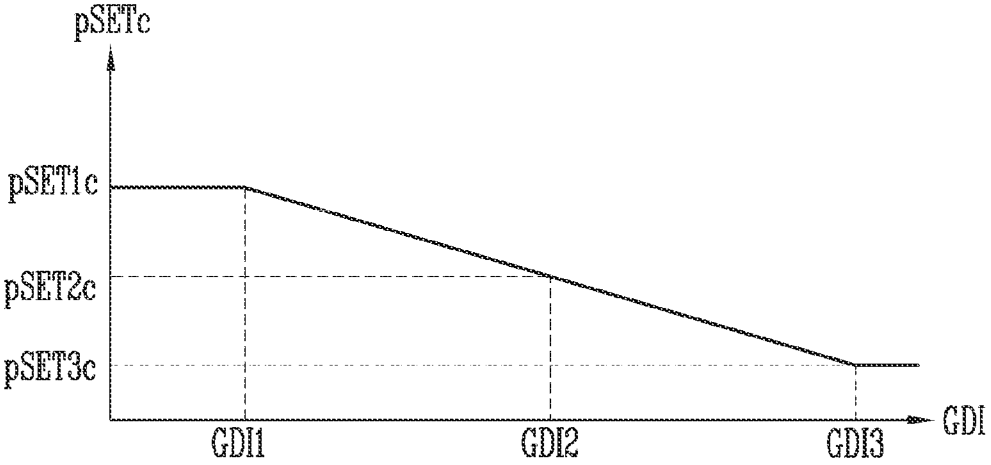
Figure 13:
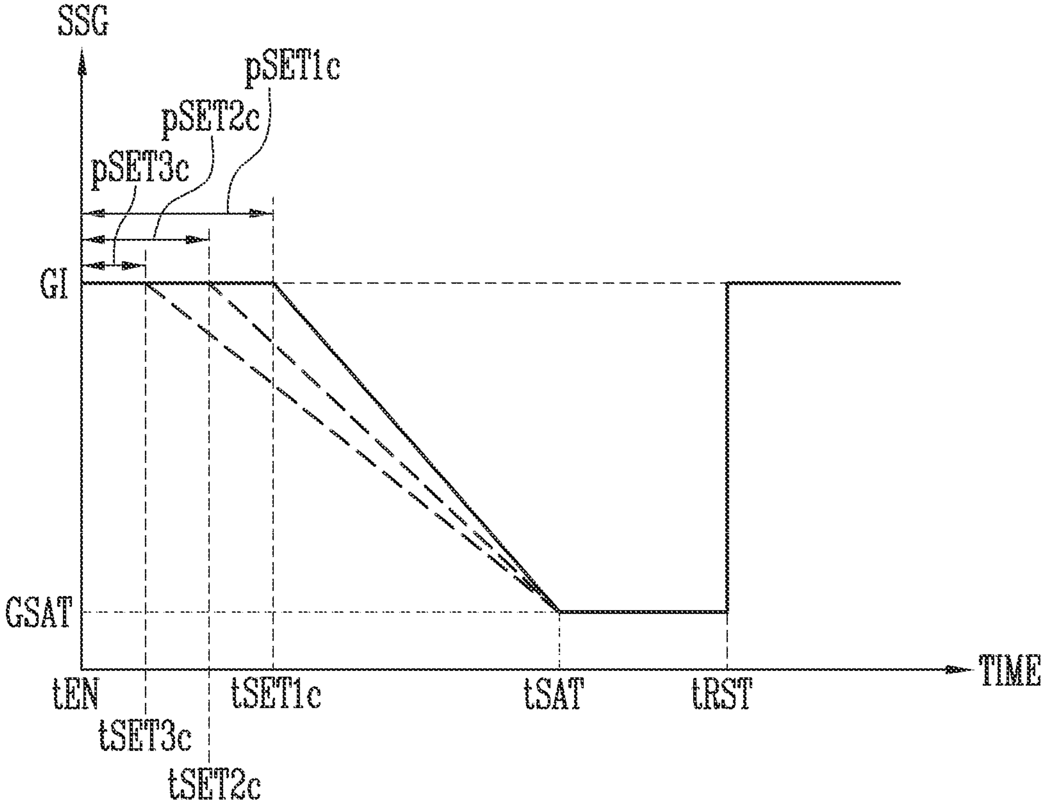

FIGS. 11 to 13 are diagrams for explaining a gain providing unit according to some example embodiments of the present invention.

Referring to FIG. 11, a gain providing unit 15*c* according to some example embodiments of the present invention may include a still region detection unit 151, a grayscale comparison unit 155, a set period setting unit 152, and a gain generating unit 153. Description of the still region detection unit 151 will be omitted to avoid duplication.

The gain providing unit 15*c* may set a set period pSETc shorter as a difference GDI between the grayscale values STI in the first region AR1 and the grayscale values in the peripheral region of the first region AR1 is larger. For example, the gain providing unit 15*c* may set the set period pSETc shorter as the difference GDI between the average value of the grayscale values STI in the first region AR1 and an average value of the grayscale values in the peripheral region of the first region AR1 is larger.

The grayscale comparison unit 155 may calculate the difference GDI between the grayscale values STI in the first region AR1 and the grayscale values in the peripheral region of the first region AR1. For example, the grayscale comparison unit 155 may calculate the difference GDI between the average value of the grayscale values STI in the first region AR1 and the average value of the grayscale values in the peripheral region of the first region AR1.

The set period setting unit 152 may set the set period pSETc shorter as the difference GDI is larger.

Referring to FIG. 12, the set period setting unit 152 may set a first period pSET1*c* as the set period pSETc when the difference GDI is a first level GDI1. The set period setting unit 152 may set a second period pSET2*c* as the set period pSETc when the difference GDI is a second level GDI2. Also, the set period setting unit 152 may set a third period pSET3*c* as the set period pSETc when the difference GDI is a third level GDI3. In this case, the second level GDI2 may be greater than the first level GDI1, and the third level GDI3 may be greater than the second level GDI2. In this case, the second period pSET2*c* may be shorter than the first period pSET1*c*, and the third period pSET3*c* may be shorter than the second period pSET2*c*. The first, second, and third periods pSET1*c*, pSET2*c*, and pSET3*c* for the first, second, and third levels GDI1, GDI2, and GDI3 may be previously stored in a lookup table or the like, respectively, or may be calculated by an algorithm.

The gain generating unit 153 may gradually decrease the gain value SSG from the set time tSET based on the set period pSETc.

Referring to FIG. 13, when the gain generating unit 153 receives the set period pSETc of the first period pSET1*c*, the gain generating unit 153 may set a first time point tSET1*c* elapsed by the first period pSET1*c* from the enable time point tEN as the set time tSET. When the gain generating unit 153 receives the set period pSETc of the second period pSET2*c*, the gain generating unit 153 may set a second time point tSET2*c* elapsed by the second period pSET2*c* from the enable time point tEN as the set time tSET. Also, when the gain generating unit 153 receives the set period pSETc of the third period pSET3*c*, the gain generating unit 153 may set a third time point tSET3*c* elapsed by the third period pSET3*c* from the enable time point tEN as the set time tSET. In this case, the first time point tSET1*c* may be later than the second time point tSET2*c*, and the second time point tSET2*c* may be later than the third time point tSET3*c*.

The larger the difference in grayscale between the still region and the peripheral region, the more disadvantageous in terms of afterimages. According to some example embodiments, the set time tSET may be set to be faster as the difference in grayscale between the still region and the peripheral region is larger. Therefore, the afterimages can be prevented or reduced and the power consumption can be reduced.

Figure 14:
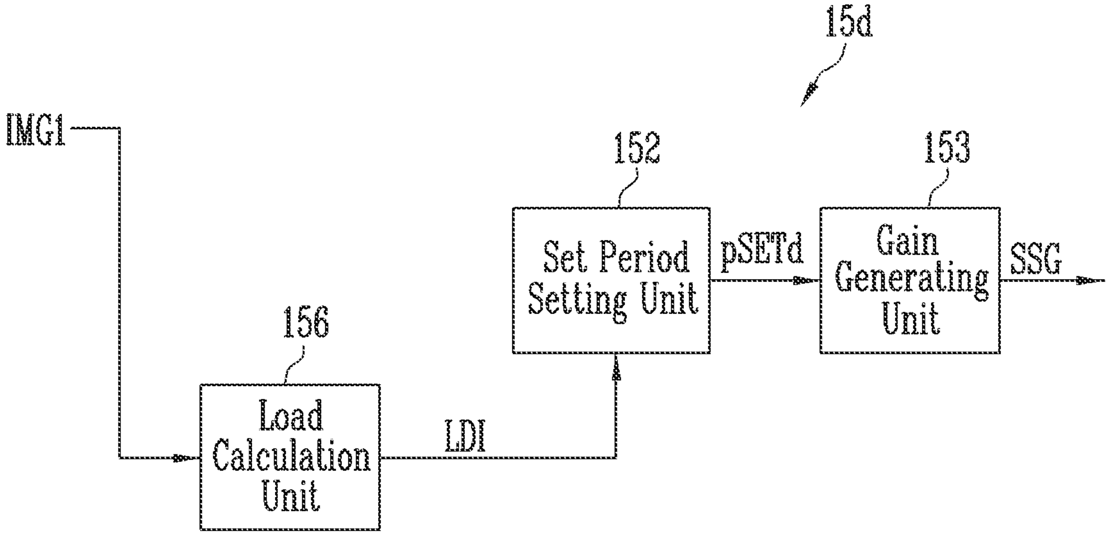
FIGS. 14 to 16 are diagrams for explaining a gain providing unit according to some example embodiments of the present invention.
Figure 15:
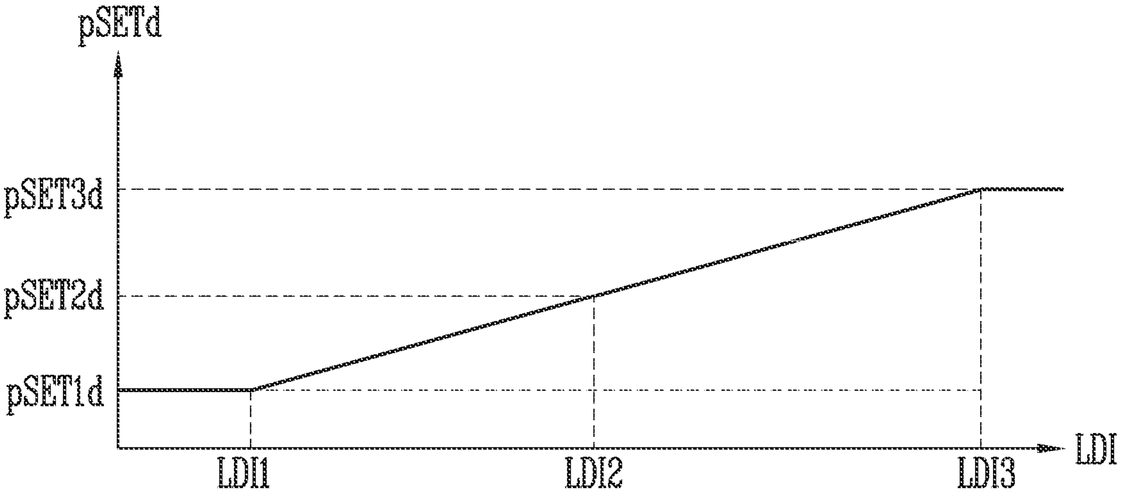
Figure 16:
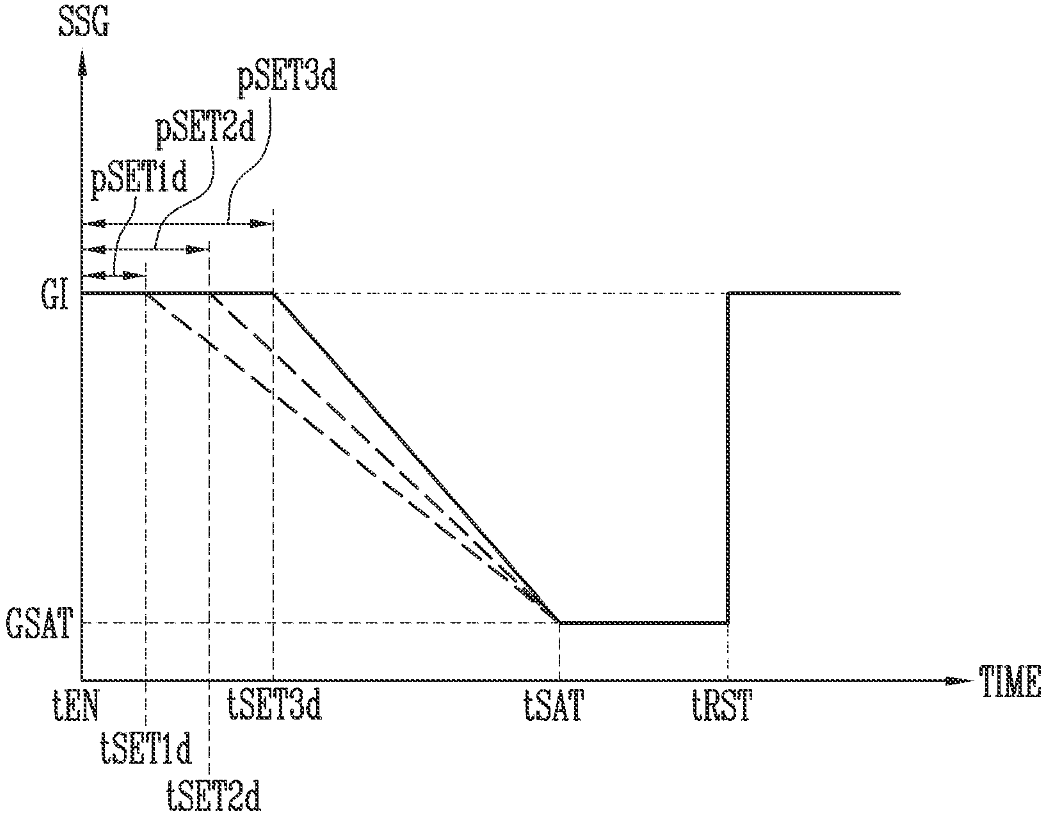

FIGS. 14 to 16 are diagrams for explaining a gain providing unit according to some example embodiments of the present invention.

Referring to FIG. 14, a gain providing unit (or gain provider or gain providing circuit) 15*d* according to some example embodiments of the present invention may include a load calculation unit (or load calculator or loan calculation circuit) 156, a set period setting unit (or set period setter or set period setting circuit) 152, and a gain generating unit (or gain generator or gain generating circuit) 153.

The gain providing unit 15*d* may set a set period pSETd shorter as a load value LDI of the input image IMG1 is smaller. For example, the load value LDI may be a sum value or an average value of grayscale values of the third region AR3 that is the entire region of the input image IMG1.

The load calculation unit 156 may calculate the sum value or the average value of the grayscale values of the entire region of the input image IMG1 as the load value LDI. According to some example embodiments, the load calculation unit 156 may use a load value detection algorithm according to the prior art.

The set period setting unit 152 may set the set period pSETd shorter as the load value LDI is smaller.

Referring to FIG. 15, the set period setting unit 152 may set a first period pSET1*d* as the set period pSETd when the load value LDI is a first level LDI1. The set period setting unit 152 may set a second period pSET2*d* as the set period pSETd when the load value LDI is a second level LDI2. Also, the set period setting unit 152 may set a third period pSET3*d* as the set period pSETd when the load value LDI is a third level LDI3. In this case, the second level LDI2 may be greater than the first level LDI1, and the third level LDI3 may be greater than the second level LDI2. In this case, the second period pSET2*d* may be longer than the first period pSET1*d*, and the third period pSET3*d* may be longer than the second period pSET2*d*. The first, second, and third periods pSET1*d*, pSET2*d*, and pSET3*d* for the first, second, and third levels LDI1, LDI2, and LDI3 may be previously stored in a lookup table or the like, respectively, or may be calculated by an algorithm.

The gain generating unit 153 may gradually decrease the gain value SSG from the set time tSET based on the set period pSETd.

Referring to FIG. 16, when the gain generating unit 153 receives the set period pSETd of the first period pSET1*d*, the gain generating unit 153 may set a first time point tSET1*d* elapsed by the first period pSET1*d* from the enable time point tEN as the set time tSET. When the gain generating unit 153 receives the set period pSETb of the second period pSET2*d*, the gain generating unit 153 may set a second time point tSET2*d* elapsed by the second period pSET2*d* from the enable time point tEN as the set time tSET. Also, when the gain generating unit 153 receives the set period pSETd of the third period pSET3*d*, the gain generating unit 153 may set a third time point tSET3*d* elapsed by the third period pSET3*d* from the enable time period tEN as the set time tSET. In this case, the first time point tSET1*d* may be faster than the second time point tSET2*d*, and the second time point tSET2*d* may be faster than the third time point tSET3*d*.

According to some example embodiments, the user may be insensitive to the change in luminance as the load value LDI is smaller. Therefore, the user can set the set time tSET fast. The faster the set time tSET is, the effect of preventing or reducing afterimages and reducing power consumption can be maximized or improved.

Figure 17:
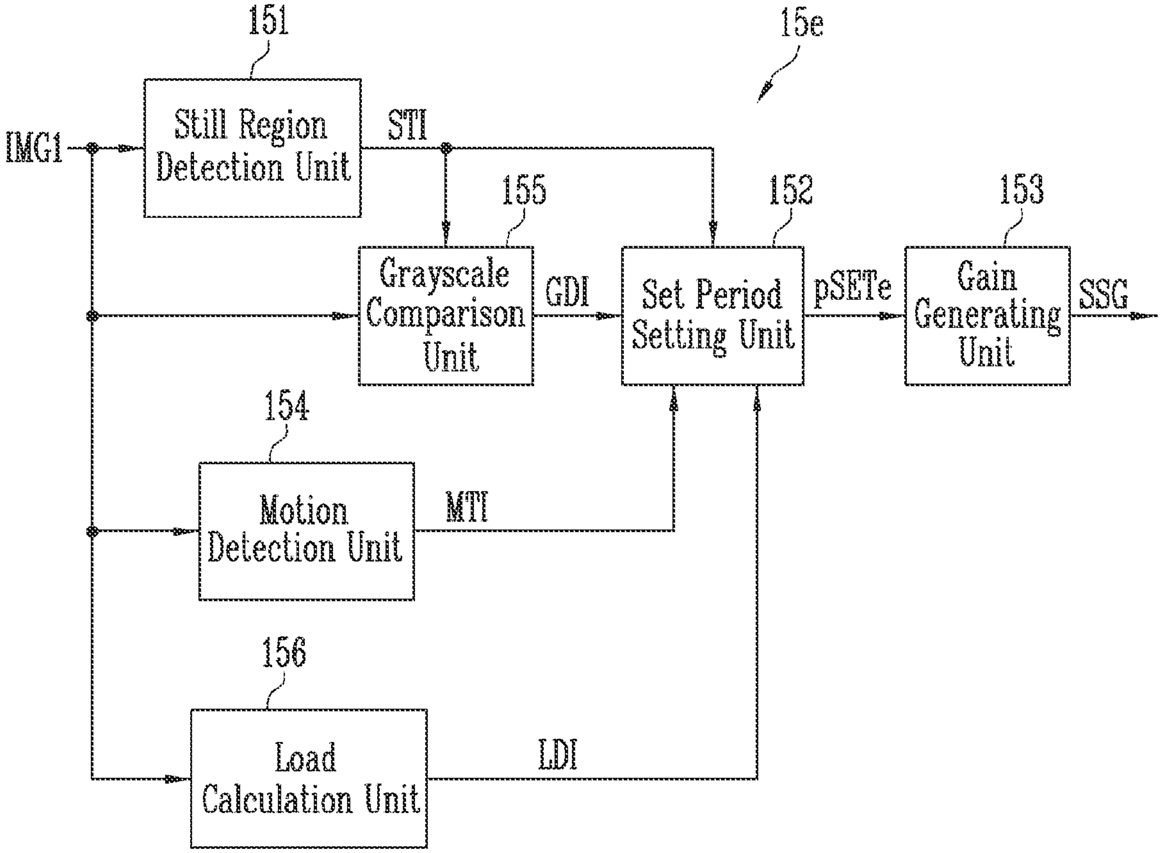
FIG. 17 is a diagram for explaining a gain providing unit according to some example embodiments of the present invention.

FIG. 17 is a diagram for explaining a gain providing unit according to some example embodiments of the present invention.

Referring to FIG. 17, a gain providing unit 15*e* according to some example embodiments of the present invention may include a still region detection unit (or still region detector or still region detecting circuit) 151, a set period setting unit 152, a gain generating unit 153, a motion detection unit 154, and a load calculation unit 156. Descriptions of components described in the above-described embodiments will be omitted to avoid duplication.

The set period setting unit 152 may set a set period pSETe based on the grayscale values STI, the difference GDI, the motion degree MTI, and the load value LDI. For example, the set period setting unit 152 may determine the set period pSETe by applying weights corresponding to the set periods pSETa, pSETb, pSETc, and pSETd, and summing the set periods pSETa, pSETb, pSETc, and pSETd to which the weights are applied.

The display device and the driving method thereof according to the present invention may appropriately set the set time according to the display image in the screen saver function.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

The drawings referred to heretofore and the detailed description of the invention described above are merely illustrative of the invention. It is to be understood that the invention has been disclosed for illustrative purposes only and is not intended to limit the scope of the invention. Therefore, those skilled in the art will appreciate that various modifications and equivalent embodiments are possible without departing from the scope of the invention. Accordingly, the true scope of the invention should be determined by the technical idea of the appended claims and their equivalents.

What is claimed is:

1. A display device comprising:

a plurality of first pixels configured to display a still image portion; and a plurality of second pixels configured to display a moving image portion, wherein from a first time point elapsed by a first period from a display start time point of the still image portion, the first pixels gradually decrease an average luminance of the still image portion, and the second pixels gradually decrease an average luminance of the moving image portion, wherein the average luminance of the still image portion is maintained during the first period, and wherein the first period is set to be shorter as a motion degree of the moving image portion is larger.

2. The display device of claim 1, wherein the first period is set differently according to an average luminance of the first pixels at the display start time point.

3. A display device comprising:

a plurality of first pixels configured to display a still image portion; and a plurality of second pixels configured to display a moving image portion, wherein from a first time point elapsed by a first period from a display start time point of the still image portion, the first pixels gradually decrease an average luminance of the still image portion, and the second pixels gradually decrease an average luminance of the moving image portion, wherein the average luminance of the still image portion is maintained during the first period, and wherein the first period is set to be shorter as the average luminance of the first pixels at the display start time point is larger.

4. A display device comprising:

a plurality of first pixels configured to display a still image portion; and a plurality of second pixels configured to display a moving image portion, wherein from a first time point elapsed by a first period from a display start time point of the still image portion, the first pixels gradually decrease an average luminance of the still image portion, and the second pixels gradually decrease an average luminance of the moving image portion, wherein the average luminance of the still image portion is maintained during the first period, and wherein the first period is set to be shorter as a difference between the average luminance of the still image portion and the average luminance of the moving image portion is larger.

5. The display device of claim 1, further comprising:

a gain provider configured to gradually decrease a gain value from the first time point; and a grayscale converter configured to generate an output image by applying the gain value to an input image including a first region corresponding to the still image portion and a second region corresponding to the moving image portion, wherein the gain provider is configured to set the first period differently according to size of grayscale values in the first region, and wherein the gain value is maintained during the first period.

6. The display device of claim 5, wherein the gain provider is configured to set the first period shorter as the grayscale values in the first region are larger.

7. The display device of claim 6, wherein the gain provider is configured to set the first period shorter as an average value of the grayscale values in the first region is larger.

8. The display device of claim 5, wherein the gain provider is configured to set the first period shorter as a motion degree in the second region is larger.

9. The display device of claim 5, wherein the gain provider is configured to set the first period shorter as a motion degree in a peripheral region of the first region is larger.

10. The display device of claim 5, wherein the gain provider is configured to set the first period shorter as a difference between the grayscale values in the first region and grayscale values in a peripheral region of the first region is larger.

11. The display device of claim 10, wherein the gain provider is configured to set the first period shorter as a difference between an average value of the grayscale values in the first region and an average value of the grayscale values in the peripheral region is larger.

12. The display device of claim 5, wherein the gain provider is configured to set the first period shorter as a load value of the input image is smaller.

13. The display device of claim 12, wherein the load value is a sum value or an average value of grayscale values in an entire region of the input image.

14. The display device of claim 5, wherein the gain provider includes:

a still region detector configured to detect the first region of the input image as the still image portion and to provide the grayscale values of the first region;

a first period setter configured to set the first period shorter as the grayscale values in the first region are larger; and a gain generator configured to gradually decrease the gain value from the first time point based on the first period.

15. The display device of claim 14, wherein the gain provider further includes a motion detector configured to detect a motion degree in the second region, and wherein the first period setter is configured to set the first period shorter as the motion degree is larger.

16. The display device of claim 15, wherein the gain provider further includes a grayscale comparator configured to calculate a difference between the grayscale values in the first region and grayscale values in a peripheral region of the first region, and wherein the first period setter is configured to set the first period shorter as the difference is larger.

17. The display device of claim 16, wherein the gain provider further includes a load calculator configured to calculate a sum value or an average value of grayscale values in an entire region of the input image as a load value, and wherein the first period setter is configured to set the first period shorter as the load value is smaller.

* * * * *